United States Patent

[15] 3,642,080

Forman et al.

[45] Feb. 15, 1972

| [54] | WEIGHING APPARATUS | |
|---|---|---|
| [72] | Inventors: | Arthur Walter Forman, Northwood, Middlesex; Mark Sitkowski, Northolt, Middlesex, both of England |
| [73] | Assignee: | Driver Southall Limited, Middlesex, England |
| [22] | Filed: | June 16, 1969 |
| [21] | Appl. No.: | 833,416 |

[30] Foreign Application Priority Data

June 19, 1968 Great Britain......................29,086/68

[52] U.S. Cl. .........................................177/110, 177/DIG. 5
[51] Int. Cl. .....................................................G01g 13/16
[58] Field of Search.....................177/105, 108, 110, DIG. 5

[56] References Cited

UNITED STATES PATENTS

| 397,594 | 2/1889 | Holley et al............................177/108 |
| 628,894 | 7/1899 | Outcalt.............................177/DIG. 5 |
| 664,619 | 12/1900 | Boggs.....................................177/108 |
| 1,083,959 | 1/1914 | Yoglesong...............................177/108 |
| 3,071,202 | 1/1963 | Lytton et al........................177/DIG. 5 |
| 3,379,267 | 4/1968 | Mackenzie..............................177/108 |

*Primary Examiner*—Richard B. Wilkinson
*Assistant Examiner*—George H. Miller, Jr.
*Attorney*—Norris & Bateman

[57] ABSTRACT

Weighing apparatus including a weigh pan, a discharge door and permanent magnetic closure means for retaining the door in a closed position, wherein electromagnetic means are provided to coact with the permanent magnet so that current passed through the electromagnet opens the door by magnetic repulsion of the permanent magnet.

7 Claims, 3 Drawing Figures

WEIGHING APPARATUS

This invention relates to weighing apparatus of the kind wherein material is delivered to and weighed in a weigh pan for subsequent discharge through a door in the pan when a given load is present therein.

The object of the invention is the provision of weighing apparatus which is an improvement in the apparatus described and claimed in our U.S. Pat. No. 3,379,267.

In accordance with the invention a weighing apparatus including a weigh pan having a material-receiving body, a discharge door, and permanent magnet closure means for retaining the door in a closed position, is characterized by electromagnetic means operatively energizable by current flowing in a first direction to open the door by magnetic repulsion of said permanent magnet means.

A preferred embodiment of the invention is now more particularly described with reference to the accompanying drawings wherein.

Figure 1:
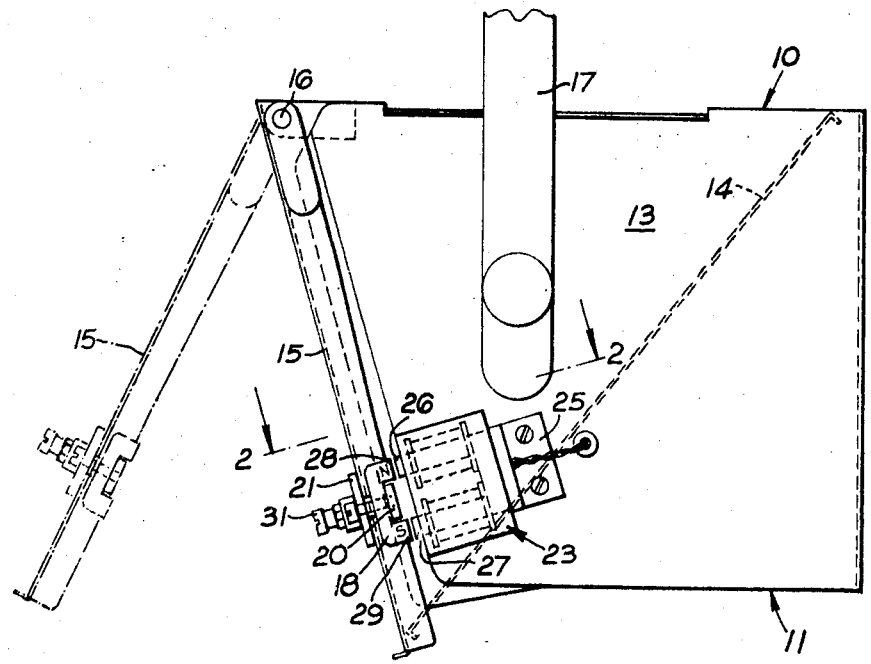
FIG. 1 is a side elevation of a weigh pan forming part of a weighing apparatus.
Figure 2:
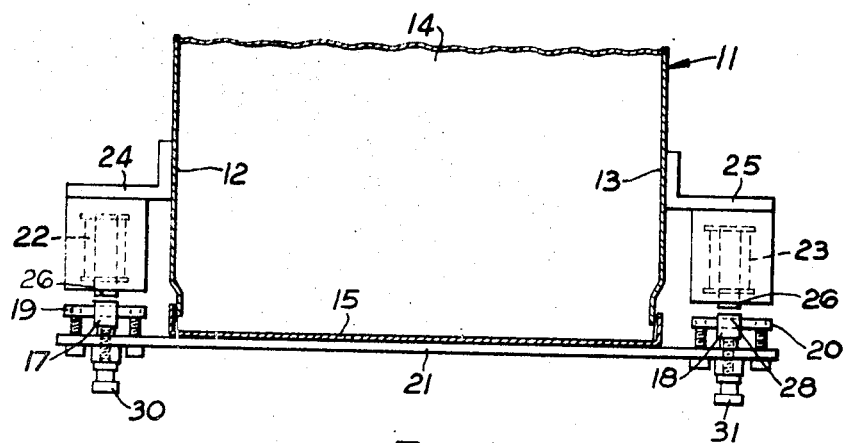
FIG. 2 is a sectional view taken along the line 2—2 of FIG. 1.

A weigh pan 10 in the form of a hopper comprises a body portion 11 made from nonmagnetic material and having a pair of parallel sidewalls 12 and 13 and an intermediate inclined rear wall 14, together with a rectangular front wall also made from nonmagnetic material constituting a discharge door 15 pivoted adjacent its upper edge on a hinge pin 16 for angular movement about a horizontal axis. The weigh pan is supported by a framework 17 attached to a weigh beam (not shown), the weighing operation being effected by conventional means. Material is fed to the pan 10 by conventional feed means (not shown) and is discharged therefrom by gravity on completion of a weighing cycle by opening door 15.

A horizontal crossmember 21 extends across door 15 and projects on each side thereof. Each end portion of the member mounts a permanent U-shaped magnet 17, 18 by means of clamps 19, 20 so that the end faces of the poles of the respective magnets lie in a plane parallel to the door and are directed toward the body portion 11. As shown the magnetic axes of these poles along which their greatest magnetic forces are exerted, extend coaxially of said legs of the electromagnet in the direction of angular movement of door 15.

A pair of dipole electromagnets 22, 23, are each mounted on a respective bracket 24, 25 attached to respective sidewalls 12, 13. Each magnet has a soft iron U-shaped core, each leg of which carries a coil wound in opposite directions so that when the magnet is energized the end faces of the core legs form magnetic poles having opposite polarity. The poles of electromagnet 23 are shown on the drawing at 26 and 27, the end faces thereof being respectively parallel to but separated by an airgap from the end faces of poles 28, 29 of permanent magnet 18 when door 15 is closed. Electromagnet 22 is arranged likewise with respect to permanent magnet 17. Adjustment screws 30, 31 are provided in crossmember 21 for adjustment of the airgap, which is preferably approximately one-half millimeter wide.

Figure 3:
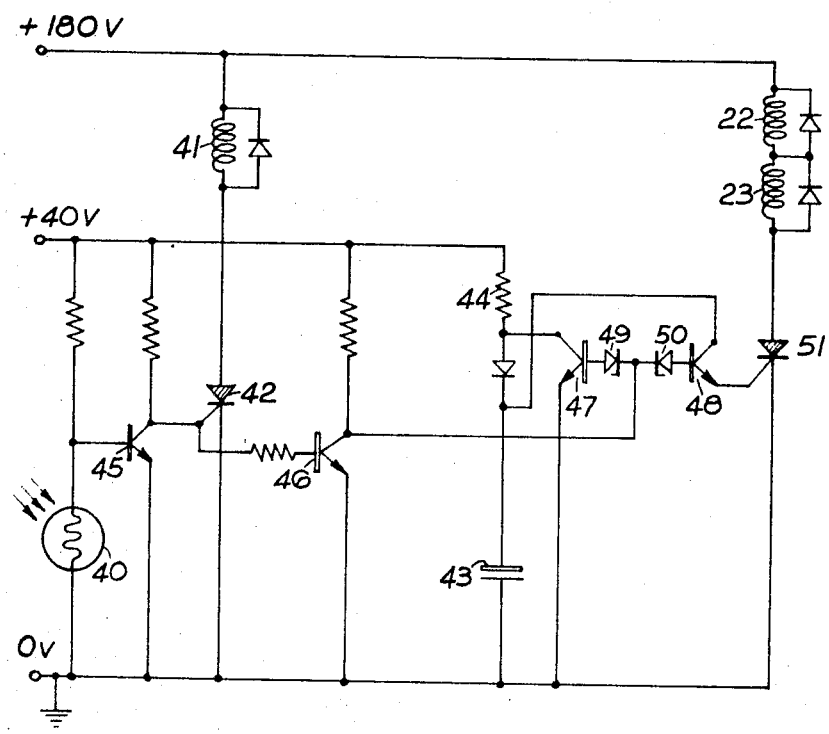
FIG. 3 is a diagram of a control circuit forming part of the apparatus of FIG. 1.

A control circuit for automatic operation of the discharge door 15 is shown in FIG. 3. Hopper 10 is filled by material feed means which is operational while a solenoid 41 is energized through thyristor 42. At the same time capacitor 43 is charged through resistor 44 and the electromagnets 22, 23 are unenergized, the circuit being maintained in this state while a photoelectric cell 40 is energized from a light source (not shown). The door 15 is kept closed by magnetic attraction between the permanent magnets 17, 18 and the deenergized cores of the electromagnets. When weighing is completed the resulting movement of the weigh beam cuts off the light from cell 40 so turning on transistor 45 which turns off thyristor 42 to deenergize solenoid 41 and stop the feed. At the same time transistor 46 is also turned off and a signal is fed to transistors 47 and 48 via zener diodes 49 and 50 so disconnecting capacitor 43 from resistor 44 and allowing it to discharge through transistor 48 to the gate of a second thyristor 51 which energizes the electromagnets 22, 23 for the period of discharge of the capacitor 43, the direction of current flow giving the poles thereof like polarity to the respective adjacent poles of the permanent magnets 17, 18 to repel them and swing door 15 open to discharge the contents of pan 10. When discharge is complete door 15 swings towards the closed position by gravity, by which time capacitor 43 has discharged so that the electromagnets are deenergized and the door is closed once more by the attraction of the permanent magnets.

In an alternative method of operation, the control circuit is arranged so that electromagnets 22, 23 are energized when the door is closed by current flowing in the opposite direction to that referred to above, and respective poles thereof have unlike polarity to respective adjacent poles of permanent magnets 17, 18 to increase the attractive force. Opening and closing of door 15 is effected by reversal of current flow by means of a changeover switch included in the control circuit. This method is particularly applicable to apparatus in which door 15 carries a substantial proportion of the weight of material in the pan.

This method may be further varied by arranging the control circuit to operate the two electromagnets 22 and 23 independently, one magnet only being energized in the manner lastly described for keeping the door shut, while the other magnet is energized only to exert a repulsive force to open door 15, current being switched from one electromagnet to the other to effect said respective operations.

In an alternative construction (not shown) the electromagnets are mounted on brackets attached to a fixed frame portion of the weighing apparatus, the magnets being aligned so that the weighing action is not interfered with.

In a third construction (not shown) the electromagnets are mounted on the inclined rear wall of the hopper body portion with the end faces of their poles aligned with the inner face of a downwardly extending edge portion of the door when closed. The permanent magnets are mounted on the opposite face of said edge portion with their poles aligned with those of the electromagnets but separated therefrom by the sheet of nonmagnetic material forming the door, the thickness of which is approximately one-half millimeter to serve in place of the airgap referred to above.

We claim:

1. A weighing apparatus comprising a weigh pan having a material-receiving body, a discharge door hinged for angular movement relative to the body, and permanent magnet closure means comprising independent first and second permanent magnet poles for exerting attractive magnetic force tending to retain the door in closed position, characterized by electromagnetic means having a least one pole whose magnetic axis is aligned substantially in the direction of angular movement of the door, said electromagnetic means comprising respectively coacting first and second electromagnet poles disposed in opposed relation to said permanent magnet poles, and means whereby one of said electromagnet poles is selectively operatively energizable upon current flow in a predetermined direction to supplement the attractive force of a respective one of the permanent magnet poles for retaining the door in closed position and the other of said electromagnet poles in selectively operatively energized upon current flow in a predetermined direction and upon deenergization of said one electromagnet pole to open the door by magnetic repulsion between said other electromagnet pole and the other of said permanent magnet poles.

2. Apparatus according to claim 1, characterized in that the permanent magnet means and the electromagnetic means are respectively mounted one on the material-receiving body of the weigh pan and one on the discharge door.

3. Apparatus according to claim 1, characterized in that said permanent magnet means and said electromagnetic means are respectively mounted one on a fixed frame of the weighing apparatus and the other on the discharge door.

4. Apparatus according to claim 1, characterized in that a pole face of the permanent magnet means and an interacting face of a pole of the associated electromagnet attracted thereby are a predetermined distance apart when the door is closed.

5. Apparatus according to claim 4, characterized by means for adjusting said predetermined distance.

6. Apparatus according to claim 1, characterized in that the door is pivotally mounted at the vicinity of its upper edge for swinging angular movement about a horizontal axis.

7. Apparatus according to claim 6, wherein the center of gravity of the door is arranged to urge it away from the closed position when it is not influenced by said permanent magnet closure means.

* * * * *